(12) United States Patent
Cimatti

(10) Patent No.: US 9,397,536 B2
(45) Date of Patent: Jul. 19, 2016

(54) ROTATING ELECTRICAL MACHINE FOR VEHICLES WITH LIQUID COOLING

(71) Applicant: FERRARI S.p.A., Modena (IT)

(72) Inventor: Franco Cimatti, Pavullo (IT)

(73) Assignee: FERRARI S.p.A. (IT)

( * ) Notice: Subject to any disclaimer, the term of this patent is extended or adjusted under 35 U.S.C. 154(b) by 309 days.

(21) Appl. No.: 14/133,342

(22) Filed: Dec. 18, 2013

(65) Prior Publication Data

US 2014/0175920 A1    Jun. 26, 2014

(30) Foreign Application Priority Data

Dec. 18, 2012  (IT) ................ BO2012A0681

(51) Int. Cl.
*H02K 9/00*    (2006.01)
*H02K 9/19*    (2006.01)
*H02K 5/20*    (2006.01)

(52) U.S. Cl.
CPC ... *H02K 9/19* (2013.01); *H02K 5/20* (2013.01)

(58) Field of Classification Search
CPC .................................. H02K 5/20; H02K 9/19
USPC ......................................... 310/52, 54, 58, 64
See application file for complete search history.

(56) References Cited

U.S. PATENT DOCUMENTS

| | | | | |
|---|---|---|---|---|
| 5,220,233 A * | 6/1993 | Birch | ................... | H02K 1/2733 310/156.28 |
| 5,859,482 A * | 1/1999 | Crowell | ................... | H02K 5/20 310/54 |
| 6,710,479 B2 * | 3/2004 | Yoshida | ................... | H02K 1/20 310/52 |
| 8,963,384 B2 * | 2/2015 | Kirkley, Jr. | .............. | H02K 1/32 310/54 |
| 2008/0024020 A1 * | 1/2008 | Iund | ........................ | H02K 5/20 310/61 |
| 2009/0127946 A1 | 5/2009 | Fee et al. | | |
| 2014/0069099 A1 * | 3/2014 | Rohwer | ................... | H02K 5/20 60/714 |

FOREIGN PATENT DOCUMENTS

| | | |
|---|---|---|
| DE | 102008049226 | 4/2010 |
| EP | 0859447 | 8/1998 |
| EP | 0899852 | 3/1999 |
| GB | 2217118 | 10/1989 |

OTHER PUBLICATIONS

Italian Search Report for Italian Application No. BO20120681, Ministero dello Sviluppo Economico, The Hague, Holland, Nov. 29, 2013, 2 pages.

* cited by examiner

*Primary Examiner* — Hanh Nguyen
(74) *Attorney, Agent, or Firm* — The Belles Group, P.C.

(57) ABSTRACT

An embodiment of a rotating electrical machine has: a shaft rotatably mounted to rotate around a central rotation axis; a rotor carried by the shaft; a stator which supports stator windings and is arranged around the rotor to enclose the rotor therein; a cylindrical casing which encloses the stator therein; and a cooling circuit which is intended for the circulation of a cooling fluid, is obtained at the casing, has a single common inlet opening for the cooling fluid axially arranged in the centre of a lateral wall of the casing, and two helicoidal paths, each of which is a mirror-image twin of the other one, centrally originates from the common inlet opening and extends from the centre of the casing towards a corresponding end of the casing.

8 Claims, 13 Drawing Sheets

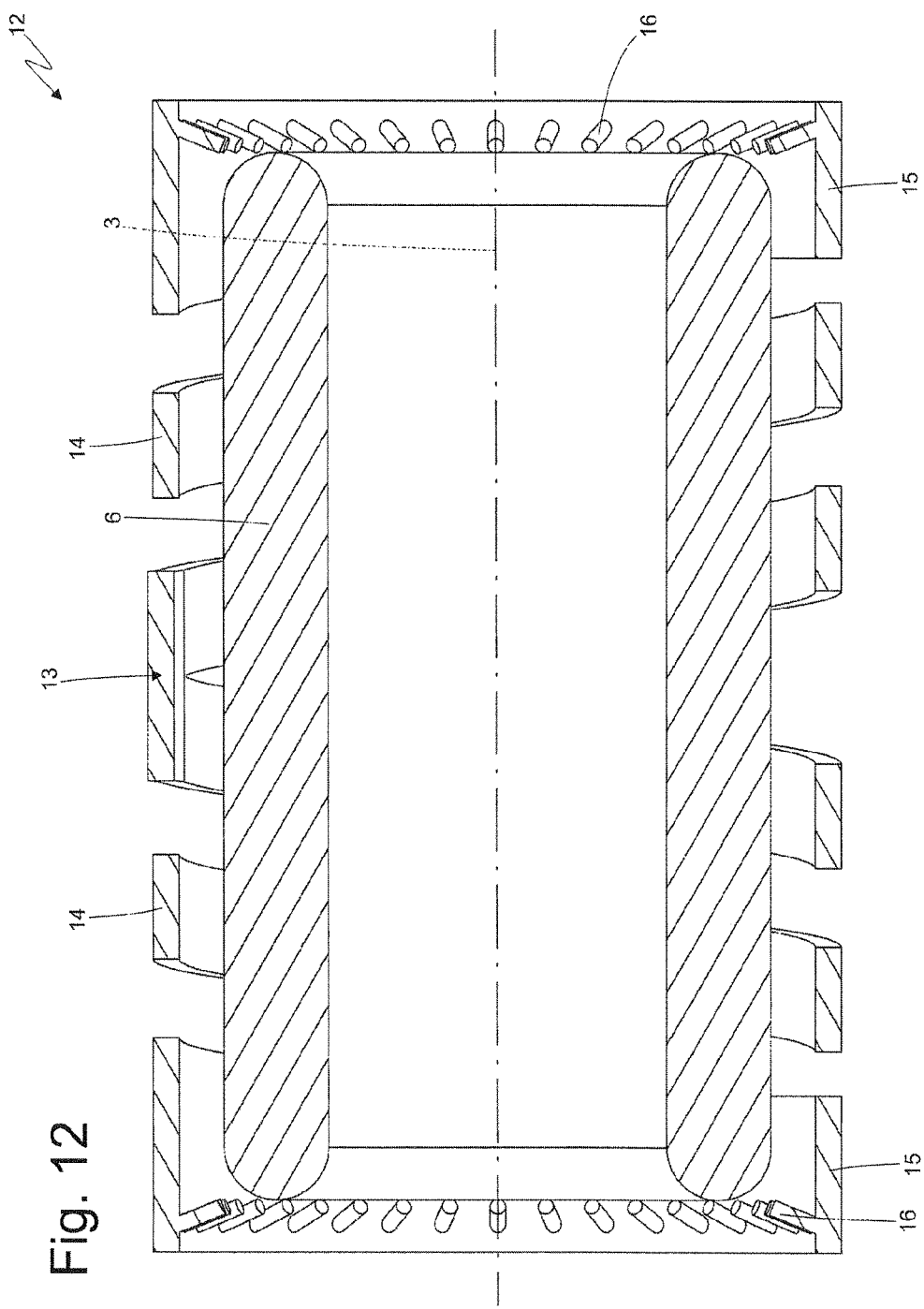

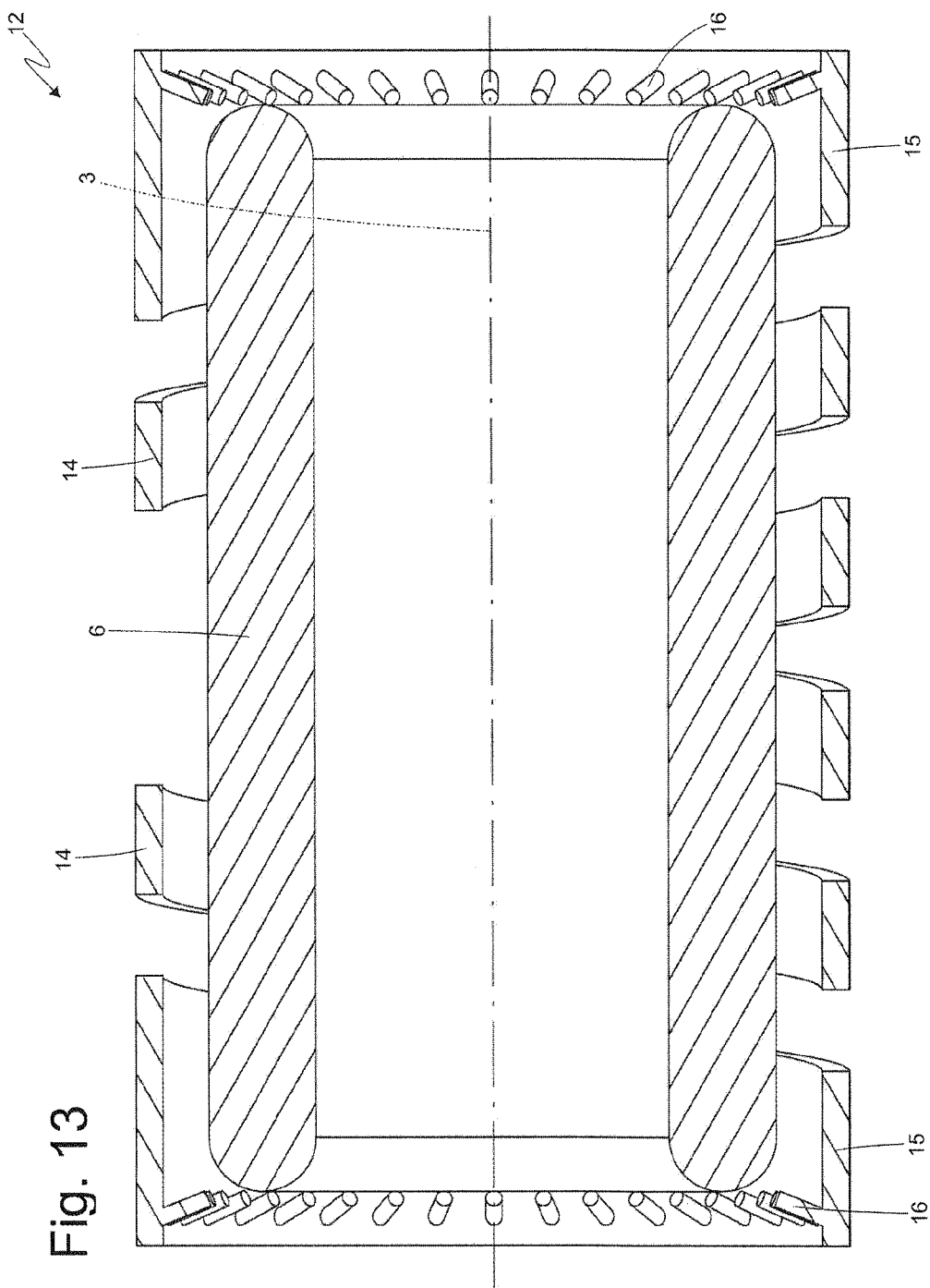

US 9,397,536 B2

ROTATING ELECTRICAL MACHINE FOR VEHICLES WITH LIQUID COOLING

PRIORITY CLAIM

The instant application claims priority to Italian Patent Application No. BO2012A000681, filed Dec. 18, 2012, which application is incorporated herein by reference in its entirety.

TECHNICAL FIELD

An embodiment relates to a rotating electrical machine for vehicles with liquid cooling.

BACKGROUND

Electrical traction combined with traditional thermal traction for making hybrid traction is becoming increasingly more popular in road vehicles.

In order to integrate an electrical machine in a road vehicle, an adequate cooling system dedicated to the electrical machine should be provided to prevent the electrical machine from overheating, and in particular to prevent the insulation of the conductors forming the stator winding from exceeding the maximum allowable temperature (the even partial melting of the insulation of the conductors forming the stator winding has a destructive effect because it causes irreversible short-circuits). It is a further object of the cooling system of the electrical machine to maintain the working temperature of the electrical machine relatively low in order to increase the efficiency of the electrical machine itself (the specific electrical resistance of the copper usually used in the stator windings increases with temperature, thus keeping lower the temperature of the electrical machine reduces the electrical resistance of the stator windings and thus losses in the stator windings due to Joule effect).

The most common cooling systems use air or water, but the use of mineral oil is becoming more frequent (typically by exploiting the same lubrication and cooling oil as the transmission oil). The use of mineral oil instead of water has some advantages because the mineral oil can also ensure the lubrication of mechanical components (mainly bearings) of the electrical machine without needing to interpose sealing devices, but also some drawbacks because mineral oil has a lower heat removal capacity than water (normally this lower heat removal capacity is compensated by keeping the temperature of the mineral oil lower, with a consequent oversizing of the cooling circuit).

Patent application DE102008049226A1, which is incorporated by reference, describes a cooling system of an electrical machine of a vehicle; the cooling system comprises an outer casing, which encloses the casing of the electrical machine therein, defining an annular cooling chamber about the electrical machine, through which a cooling fluid is made to circulate. The cooling system described in patent application DE102008049226A1 has some disadvantages, because it is not simple to be assembled about the casing of the electrical machine and does not have particularly high thermal performance (i.e. with a quantity of heat disposed per unit of circuited fluid being relatively low).

Patent application GB2217118A, which is incorporated by reference, describes a cooling system of an electrical machine having a plurality of helicoidal cooling channels which are obtained in a casing containing the electrical machine; in particular, the casing consists of an inner shell and an outer shell which are inserted into each other and in which the helicoidal cooling channels are obtained. The cooling system described in patent application GB2217118A has some drawbacks because it does not allow to cool the stator winding headers in optimal manner.

SUMMARY

An embodiment is a rotating electrical machine for vehicles with liquid cooling, which is free from the above-described drawbacks, and which is easy and cost-effective to be implemented.

BRIEF DESCRIPTION OF THE DRAWINGS

One or more embodiments will now be described with reference to the accompanying drawings, in which:

FIG. 12 is a diagrammatic, longitudinal section view taken along line XII-XII of the cooling circuit in FIG. 8; and FIG. 13 is a diagrammatic, longitudinal section view taken along line XIII-XIII of the cooling circuit in FIG. 8.

DETAILED DESCRIPTION

Figure 1:
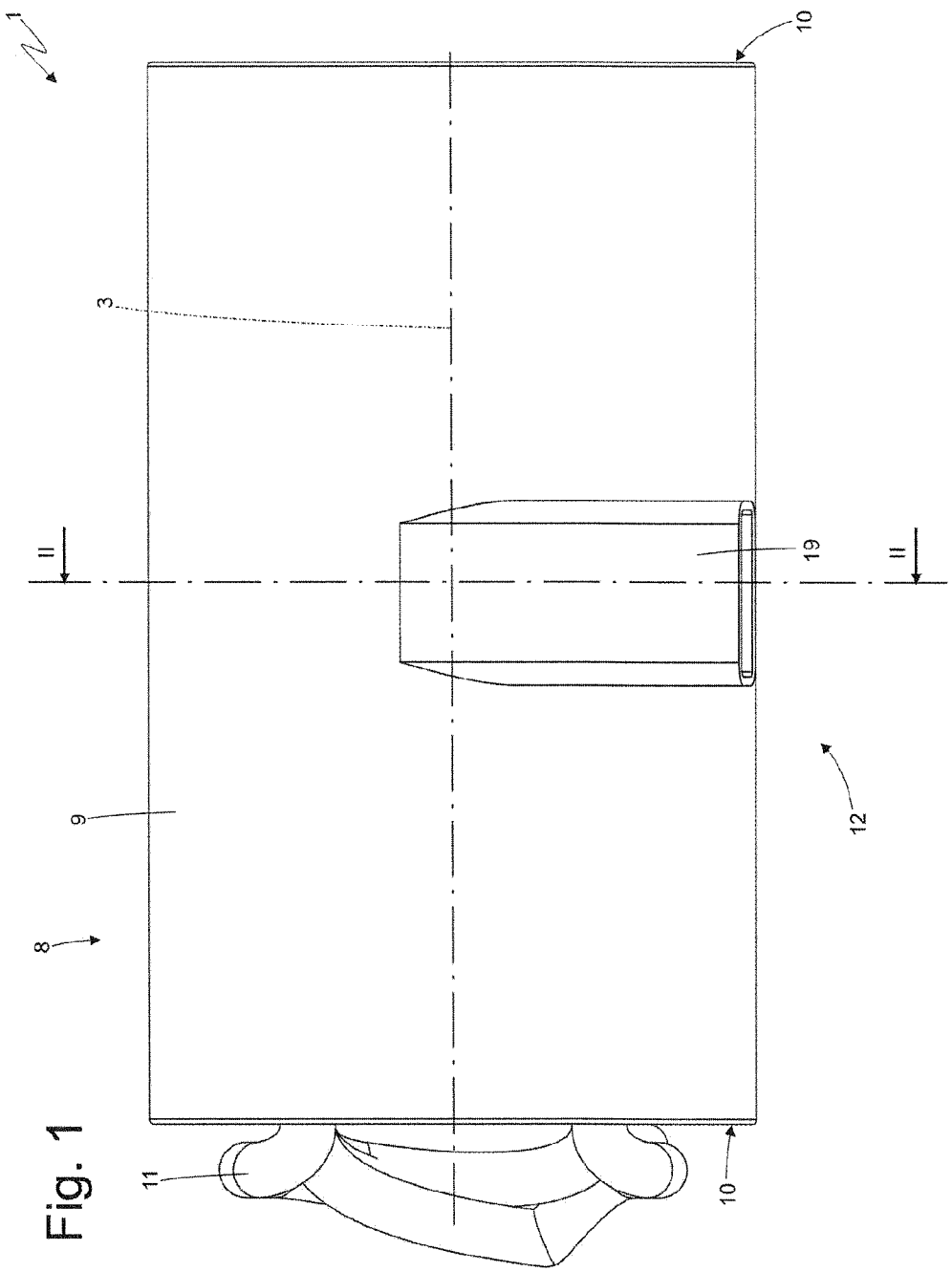
FIG. 1 is a perspective, side view of a rotating electrical machine for vehicles made according to an embodiment.
Figure 2:
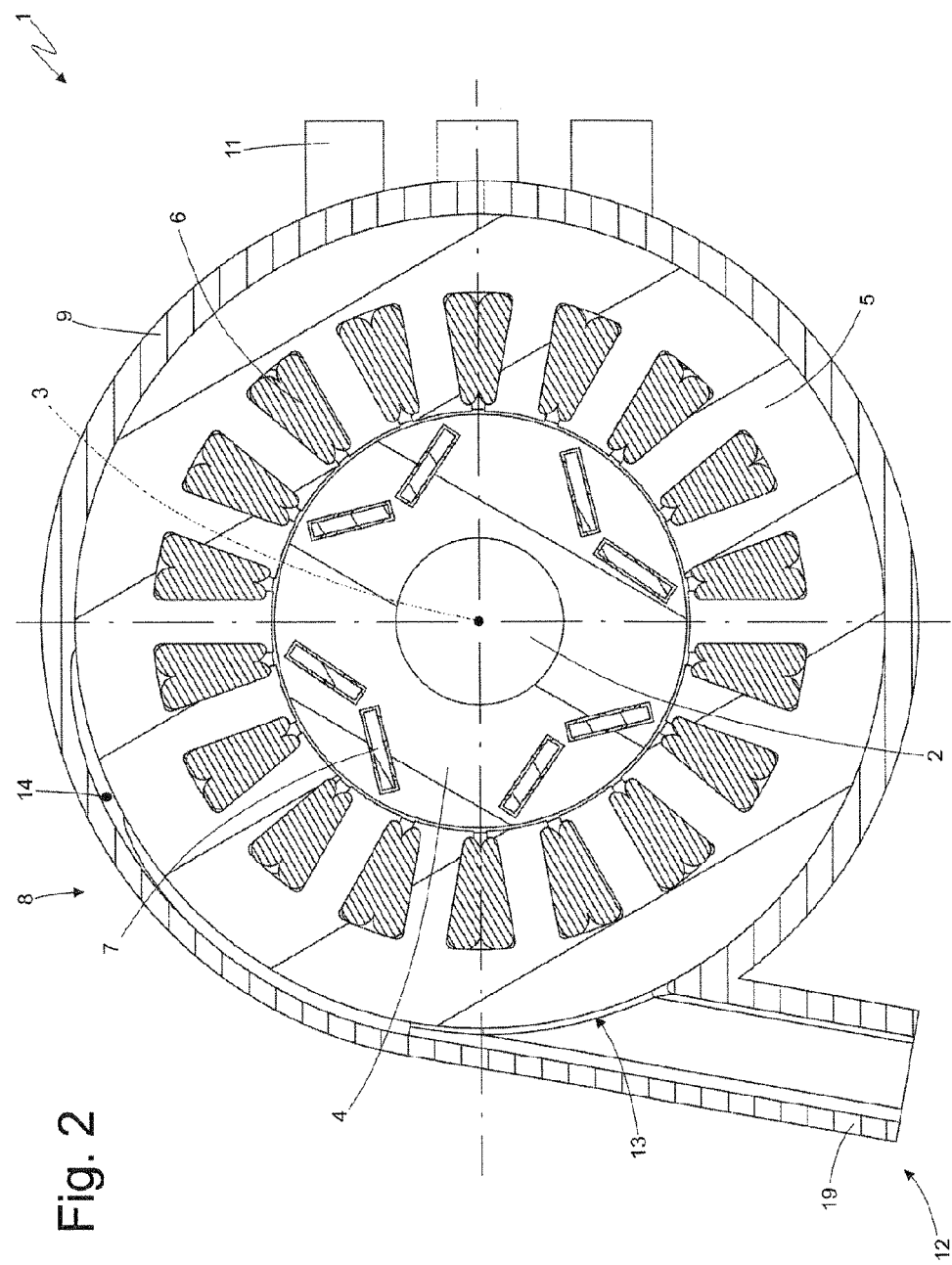
FIG. 2 is a diagrammatic, cross section view taken along line II-II of the rotating electrical machine in FIG. 1.

In FIGS. 1-2, reference numeral 1 indicates as a whole a synchronous electrical machine for vehicles of the reversible type (i.e. which can work either as electrical motor drawing electricity and generating mechanical torque, or as electrical generator drawing mechanical energy and generating electricity).

As shown in FIG. 2, the electrical machine 1 comprises a shaft 2, which is rotatably mounted to rotate about a central rotation axis 3, a cylindrical permanent magnet rotor 4 fitted on shaft 2 to rotate with the shaft 2 itself, and a cylindrical-tubular-shaped stator 5 arranged about rotor 4 to enclose the rotor 4 itself therein.

Figure 3:
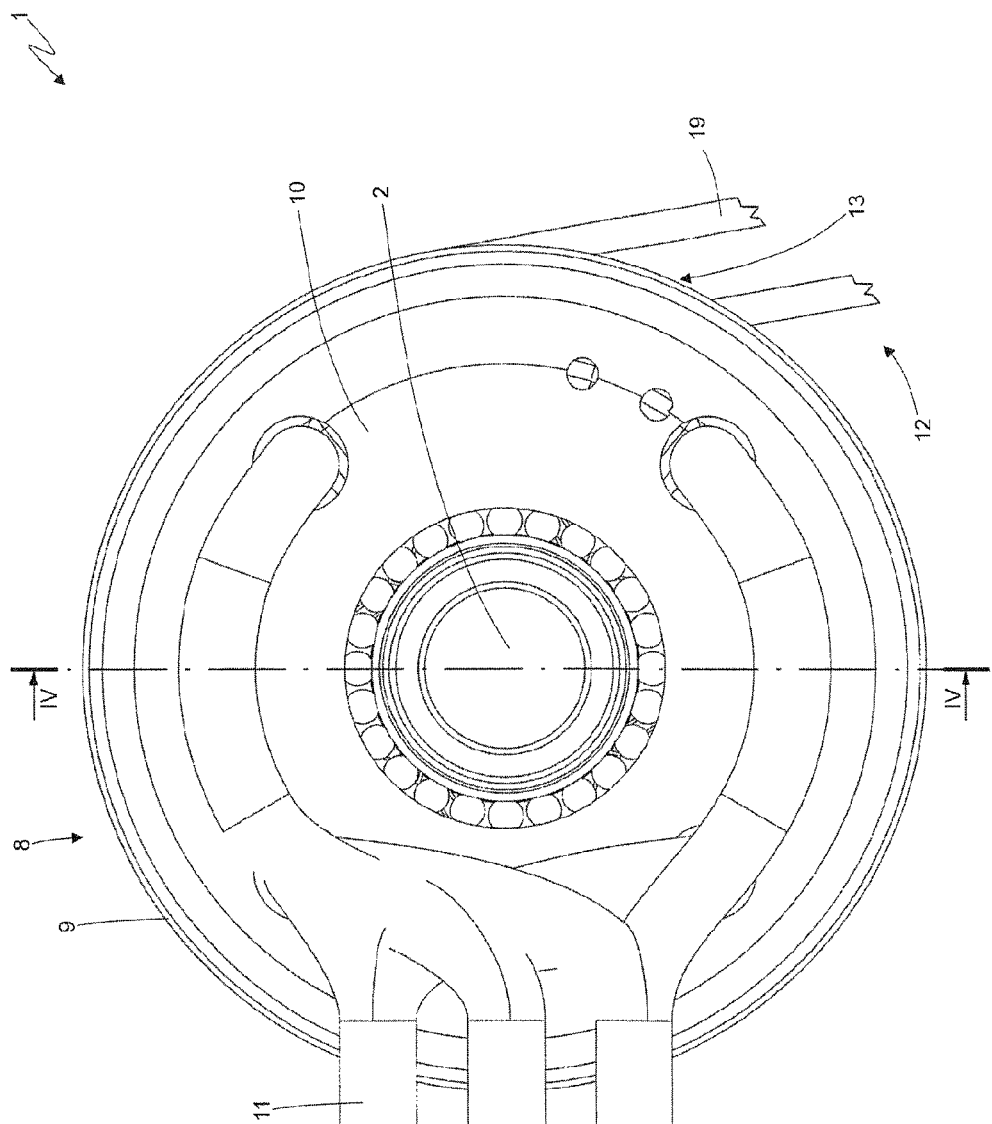
FIG. 3 is a diagrammatic, front view of the rotating electrical machine in FIG. 1.
Figure 4:
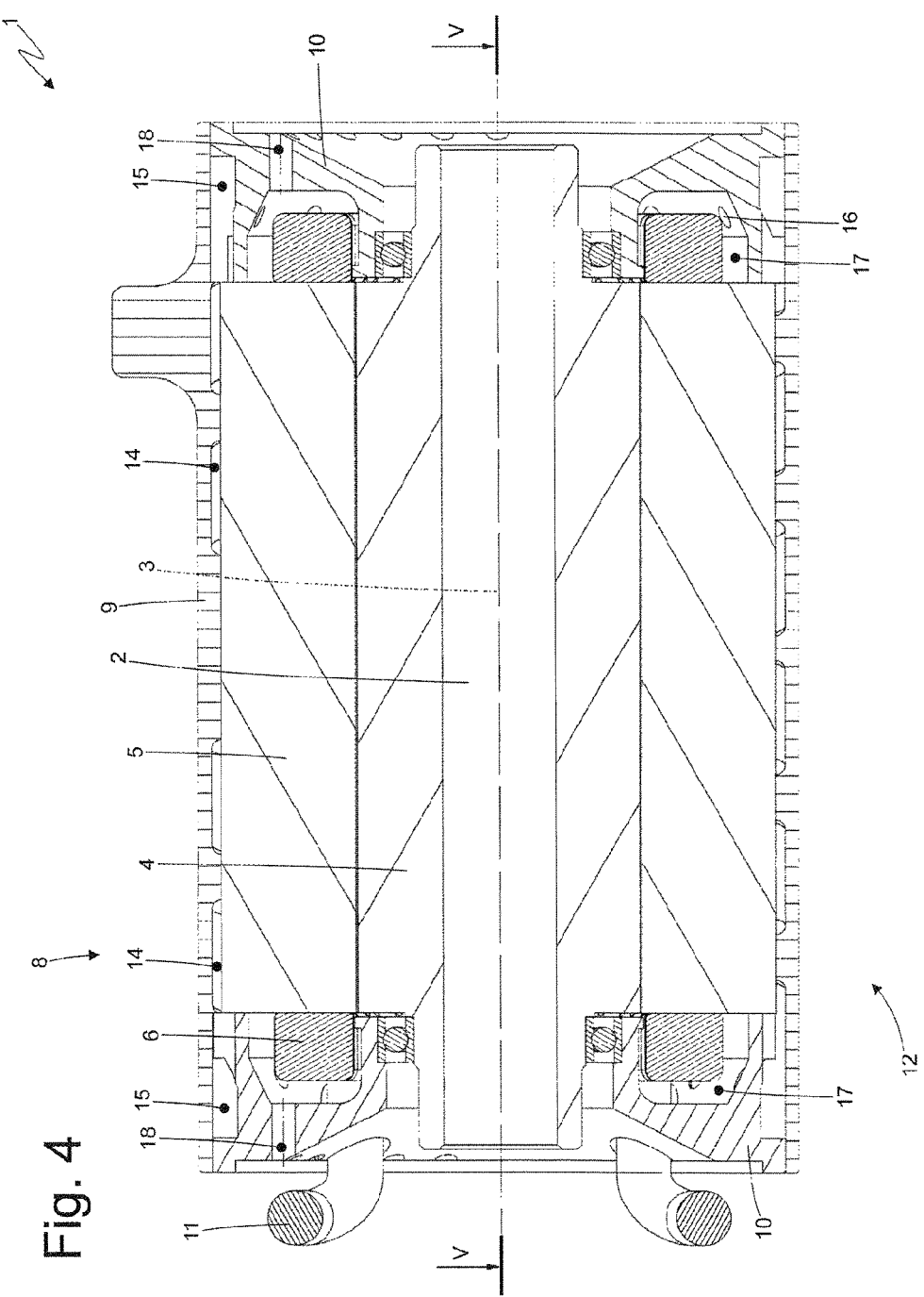
FIG. 4 is a diagrammatic, longitudinal section view taken along line IV-IV of the rotating electrical machine in FIG. 1.
Figure 5:
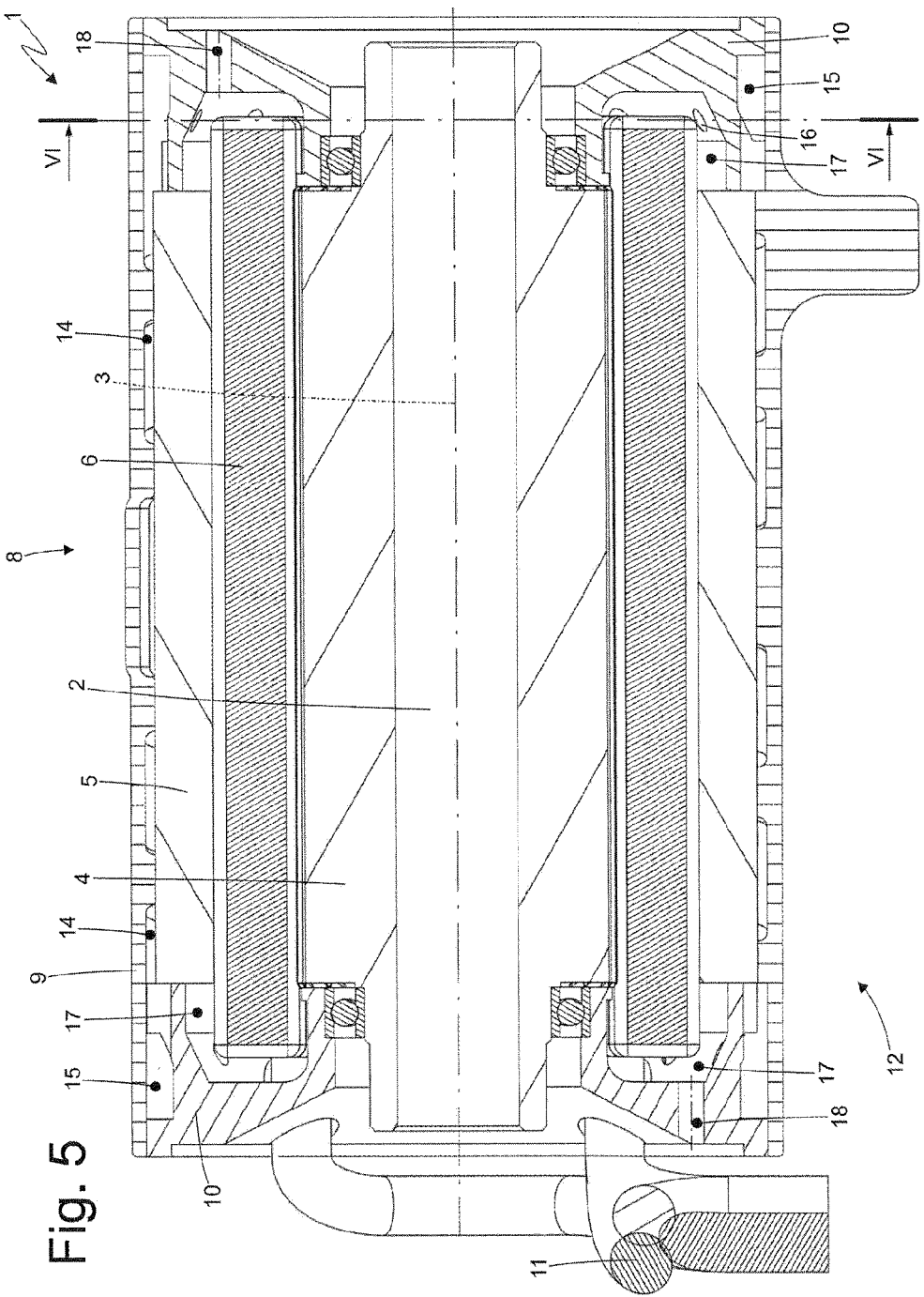
FIG. 5 is a diagrammatic, longitudinal section view taken along line V-V of the rotating electrical machine in FIG. 1.
Figure 6:
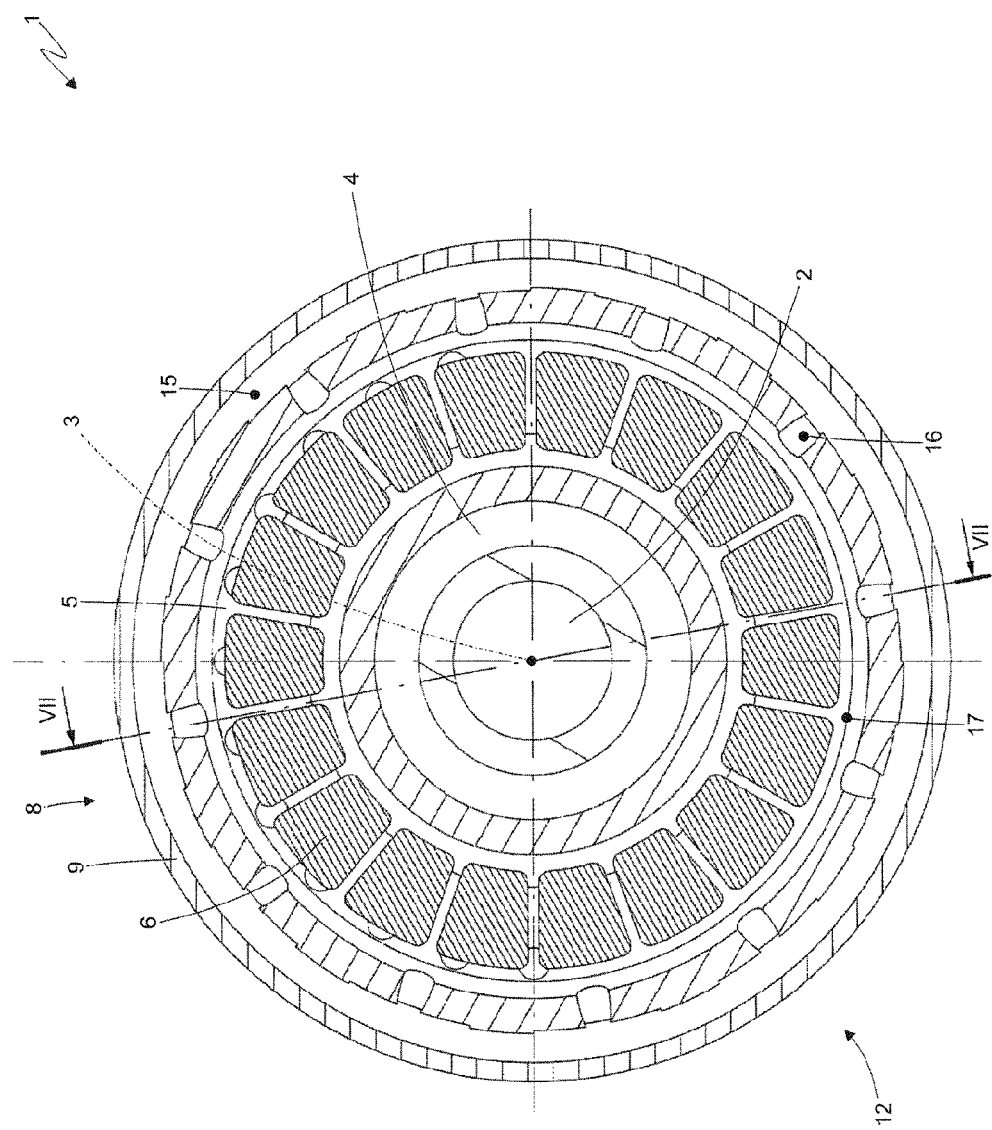
FIG. 6 is a diagrammatic, cross section view taken along line VI-VI of the rotating electrical machine in FIG. 1.
Figure 7:
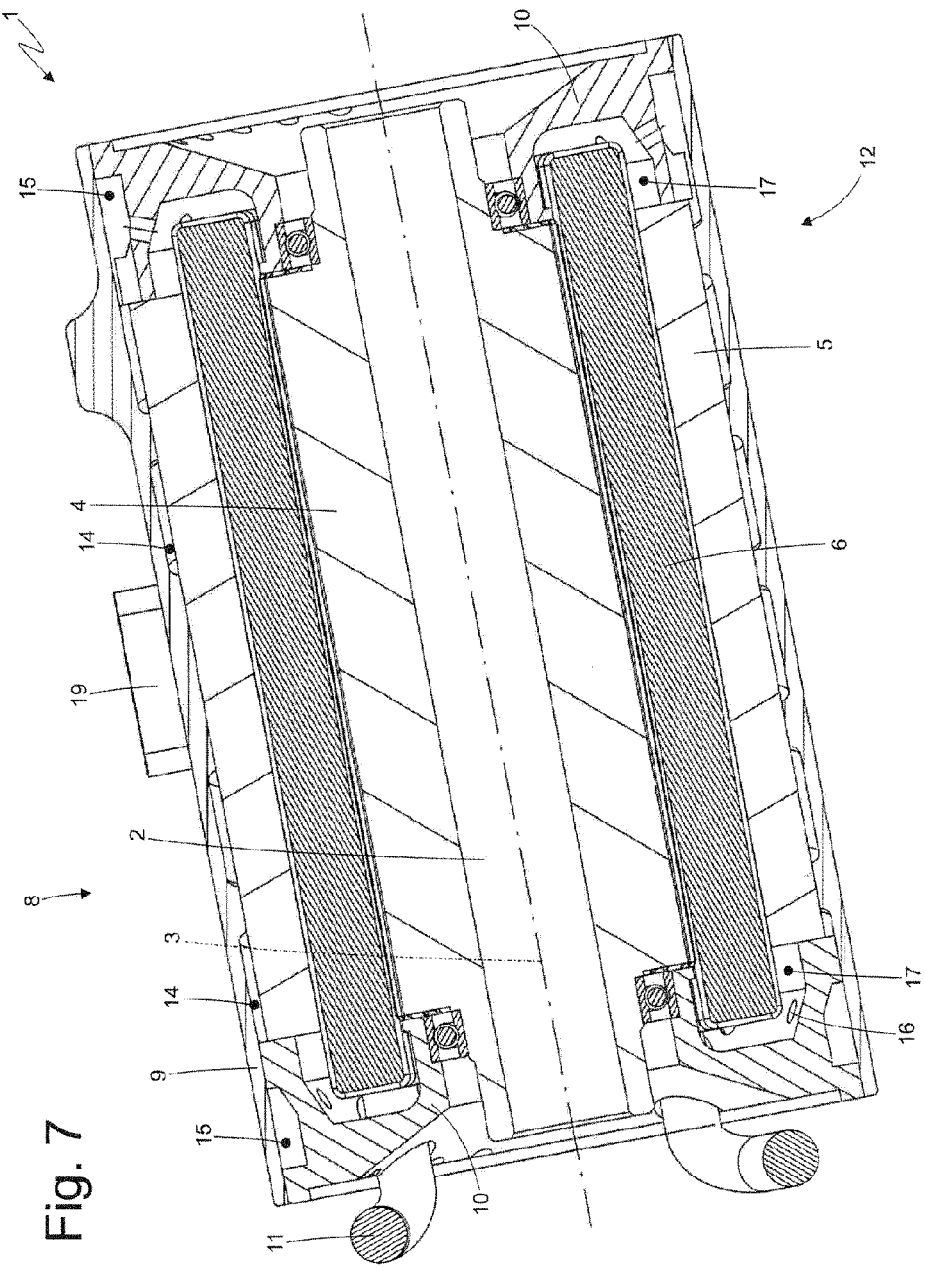
FIG. 7 is a diagrammatic, longitudinal section view taken along line VII-VII of the rotating electrical machine in FIG. 1.
Figure 8:
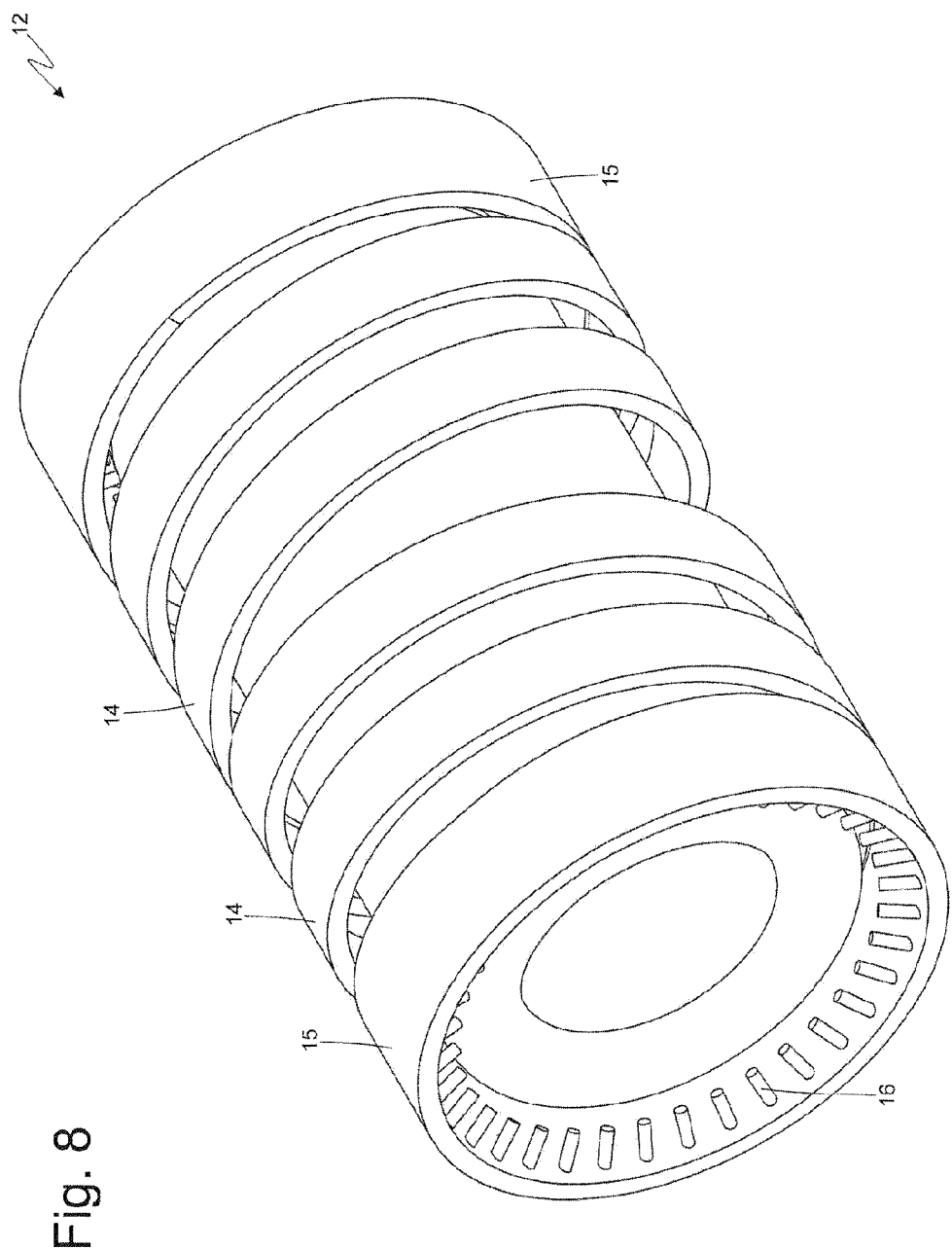
FIG. 8 is a diagrammatic, perspective view of a cooling circuit inside the rotating electrical machine in FIG. 1.
Figure 9:
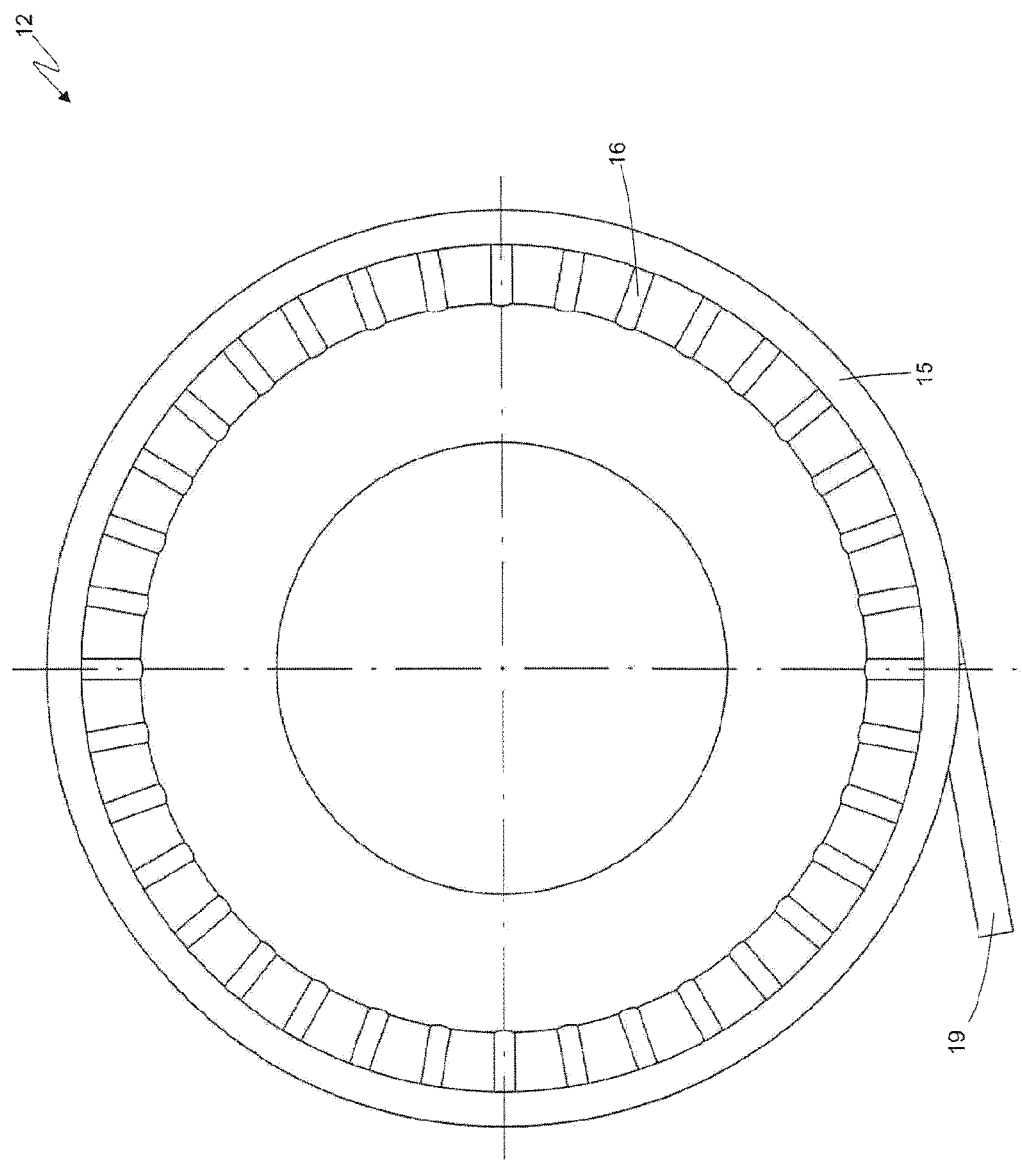
FIG. 9 is a diagrammatic side view of the cooling circuit in FIG. 8.
Figure 10:
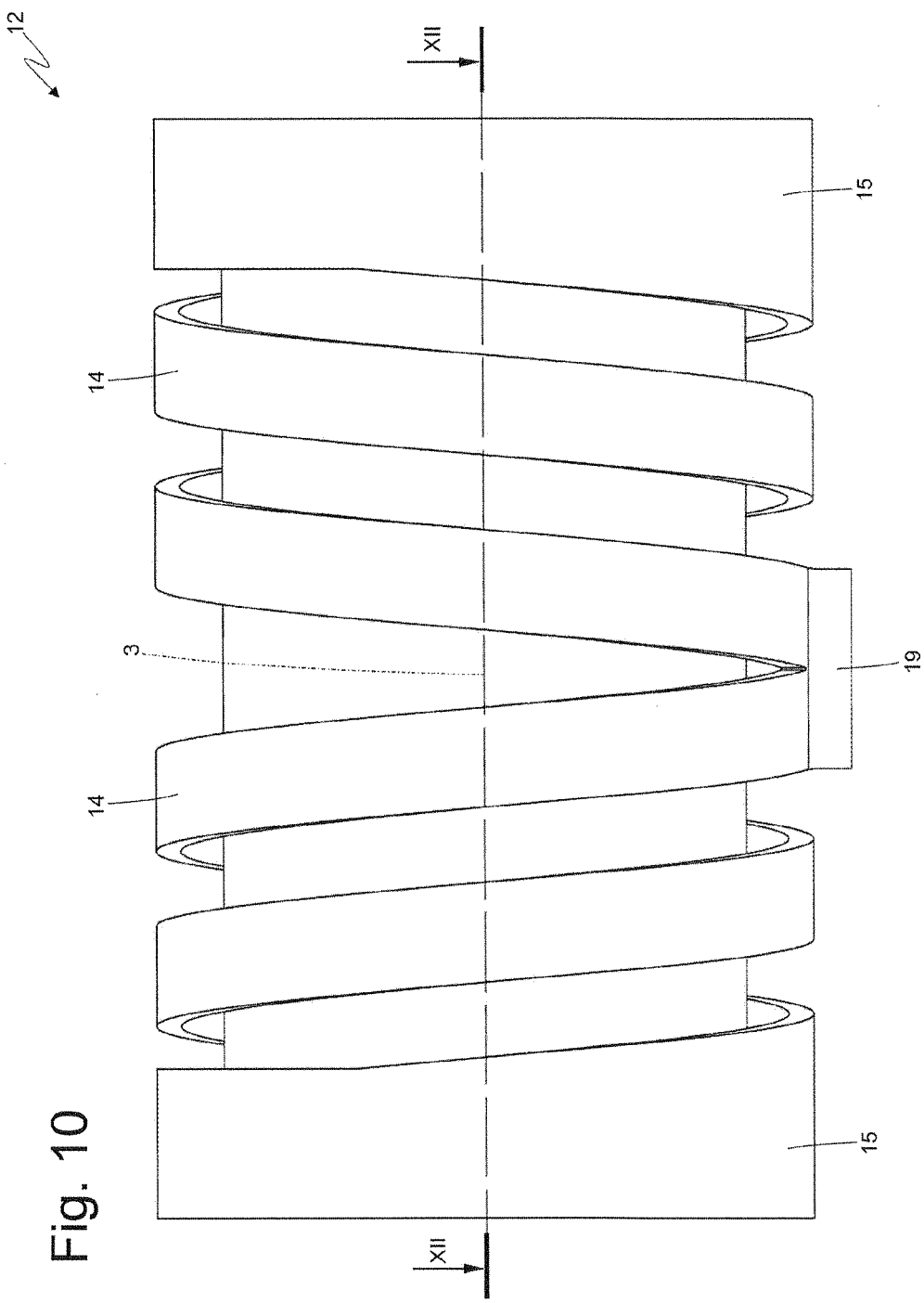
FIG. 10 is a diagrammatic front view of the cooling circuit in FIG. 8.
Figure 11:
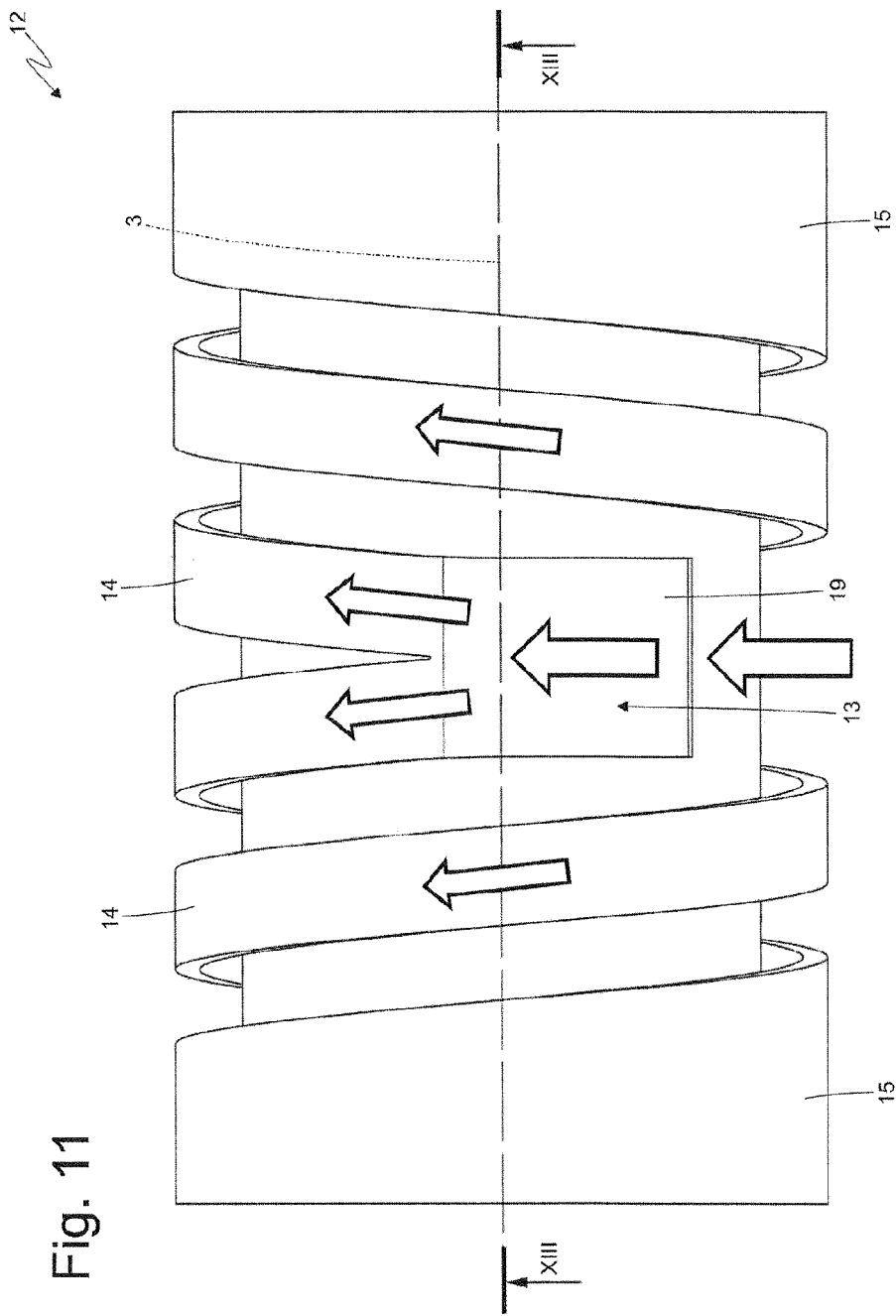
FIG. 11 is a diagrammatic bottom view of the cooling circuit in FIG. 8, with the cooling and lubrication fluid flows being highlighted.

Stator 5 comprises a toroidal-shaped magnetic core, which consists of a series of sandwiched foils and three-phase stator windings 6, which are partially arranged within corresponding axial recesses obtained in the magnetic core. The headers of the stator windings 6 axially protrude from the recesses of the magnetic core from both sides of the magnetic core itself (as shown in FIGS. 4-5 and 7). Rotor 4 comprises a cylindrical-shaped magnetic core which consists of a series of sandwiched foils and a plurality of magnetic poles consisting of permanent magnets 7 which are embedded in the magnetic core. Stator 5 is inserted into a cylindrical casing 8 which has a cylindrical-shaped side surface 9 and two circular end walls 10 (shown in FIGS. 1-2), which close the side surface 9 from opposite sides. As shown in FIG. 3, an end wall 10 of casing 8 has a central through hole to allow the mechanical connection to shaft 2 and three peripheral through holes, through which the three ends 11 of the stator windings 6 protrude.

The electrical machine 1 comprises a cooling circuit 12, along which a cooling fluid is circulated in use (typically mineral oil also having lubricating properties).

As shown in FIGS. 1-3, the cooling circuit 12 is obtained at casing 8 and has a single common inlet opening 13 for the cooling fluid, which is axially arranged in the center of the lateral wall 9 of casing 8 (in other words, the common inlet opening 13 is arranged in the center of casing 8 and through the lateral wall 9 of the casing 8 itself). Furthermore, as shown in FIGS. 8-13, the cooling circuit 12 comprises two helicoidal (i.e. spiral-shaped) paths 14, each of which is a mirror-image twin of the other one, centrally originates from the common inlet opening 13 and develops from the center of casing 8 towards a corresponding end of casing 8 (i.e. towards an end wall 10 of casing 8). Finally, as shown in FIGS. 8-13, the cooling circuit 12 comprises two annular distribution chambers 15, each of which has a circular shape, is arranged at an end of casing 8 (i.e. at an end wall 10 of casing 8), and forms the end of a corresponding helicoidal path 14 (i.e. receives an end of a corresponding helicoidal path 14); in other words, each helicoidal path 14 originates centrally from the common inlet opening 13 and ends laterally in a corresponding distribution chamber 15. These two distribution chambers 15 form two plenums which uniformly distribute the cooling liquid flow along the entire circumference.

Each distribution chamber 15 has a plurality of outlet through holes 16, which are arranged in a radial fashion and open through an inner wall of the distribution chamber 15 in order to lead to the central rotation axis 3. In essence, each outlet hole 16 forms a nozzle through which the cooling fluid contained in a corresponding distribution chamber 15 is sprayed towards the center of the electrical machine 1. Each outlet hole 16 typically has a diameter from 2 to 10 mm (a same distribution chamber 15 may comprise outlet holes 16 of different diameter).

As shown in FIGS. 4-7, a corresponding collecting chamber 17 is coupled to each distribution chamber 15, being also arranged radially and axially more inside the distribution chamber 15 itself; in each end of casing 8, the outlet holes 16 put the distribution chamber 15 into communication with the corresponding collecting chamber 17.

Preferably, the headers of the stator windings 6 (i.e. the parts of the stator windings which axially protrude from stator 5) are arranged in the collecting chambers 17. At least some of the outlet holes 16 of each distribution chamber 15 is oriented towards the headers of the stator windings 6 to promote the cooling of the headers themselves by means of continuous jets of cooling fluid; it is worth noting that the headers of the stator windings 6 are normally the hottest point of the electrical motor 1. According to a possible embodiment, all outlet holes 16 of each distribution chamber 15 are oriented towards the headers of the stator windings 6; alternatively, only some of the outlet holes 16 of each distribution chamber 15 are oriented towards the headers of the stator windings 6, while the remaining part of the outlet holes 16 in each distribution chamber 15 is oriented towards the ends of rotor 4 (i.e. towards the bearings which support shaft 2 in order to improve the lubrication of the bearings themselves).

As shown in FIGS. 4-5, each collecting chamber 17 has at least one corresponding outlet opening 18 of the cooling fluids, through which the cooling fluid is evacuated from the collecting chamber 17 and put back into circulation (i.e. passed through a radiator in order to dispose of some of the heat aspirated from the electrical machine 1, and thus pressurized and re-introduced into the cooling circuit 12 through the common inlet opening 13).

According to a preferred embodiment shown in FIGS. 4-5, and 7, each helicoidal path 14 is internally delimited by an outer surface of stator 5, and laterally and externally delimited by the lateral wall 9 of casing 8. In other words, each helicoidal path 14 is defined by a groove which is obtained through the lateral wall 9 of casing 8 and is internally closed by the outer surface of stator 5.

According to a preferred embodiment, an inlet duct 19 is provided (clearly shown in FIG. 2) for delivering the cooling fluid, the inlet duct 19 ending in the common inlet opening 13 and being oriented in a tangential fashion with respect to casing 8.

The above-described cooling circuit 12 has many advantages.

Firstly, the above-described cooling circuit 12 allows to obtain a uniform cooling which is targeted to the zones in which the heat is generated. Cooling the outside of stator 5 first (by means of the helicoidal paths 14) and then the headers of the stator windings 6 keeps uniform the thermal head between the cooling fluid and the cooled parts of the electrical machine 1: indeed, the cold cooling fluid cools down the least hot parts of the electrical machine 1 first (i.e. the outside of stator 5) and only later the hotter parts of the electrical machine 1 (i.e. the headers of the stator winding 6).

Furthermore, the above-described cooling circuit 12 allows to maintain the flowing speed of the cooling fluid (typically mineral oil) on the surfaces to be cooled to values which ensure the most effective heat removal.

It is worth noting that the above-described cooling circuit 12 was designed to be used with mineral oil, but it could be also advantageously used with other cooling fluids (typically water).

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A rotating electrical machine comprising:
    a shaft, which is mounted so as to rotate around a central rotation axis;
    a rotor, which is supported by the shaft;
    a stator, which supports stator windings provided with heads and is arranged around the rotor so as to surround the rotor;
    a cylindrical casing, which contains in its inside the stator;
    a cooling circuit, which is intended for the circulation of a cooling fluid and is obtained at the casing, has a single common inlet opening for letting the cooling fluid in, which is axially arranged at the center of a lateral wall of the casing, and has two helicoidal paths, each of which is a mirror-image twin of the other one, centrally originates from the common inlet opening and extends from the center of the casing towards a corresponding end of the casing;

two annular distribution chambers, each of which has a circular shape, is arranged at an end of the casing and forms the end of a corresponding helicoidal path; and two collecting chambers, in which the heads of the stator windings are arranged:

wherein each annular distribution chamber has a plurality of outlet through holes, which are arranged in a radial fashion, open through an inner wall of the annular distribution chamber in order to lead to the central rotation axis, and establish a communication between each distribution chamber and a corresponding collecting chamber.

2. An electrical machine according to claim 1, wherein at least part of the outlet through holes are oriented towards the heads of the stator windings.

3. An electrical machine according to claim 1, wherein part of the outlet through holes are oriented towards ends of the rotor.

4. An electrical machine according to claim 1, wherein each collecting chamber presents a corresponding outlet opening for letting the cooling fluid out.

5. An electrical machine according to claim 1, wherein each collecting chamber is radially arranged more on the inside than the corresponding distribution chamber.

6. An electrical machine according to claim 1, wherein each collecting chamber is axially arranged more on the inside than the corresponding distribution chamber.

7. An electrical machine according to claim 1, wherein each helicoidal path is internally delimited by an outer surface of the stator and laterally as well as externally delimited by the lateral wall of the casing.

8. An electrical machine according to claim 1, wherein an inlet duct is provided, which is suited to deliver the cooling fluid, ends in the common inlet opening and is oriented in a tangential fashion with respect to the casing.

* * * * *